United States Patent [19]
Horne et al.

[11] Patent Number: 6,019,349
[45] Date of Patent: Feb. 1, 2000

[54] BALL VALVE ASSEMBLIES

[75] Inventors: Timothy P. Horne, Andover; Dale S. Tripp, North Andover, both of Mass.

[73] Assignee: Watts Investment Company, Wilmington, Del.

[21] Appl. No.: 09/189,658

[22] Filed: Nov. 10, 1998

[51] Int. Cl.[7] .................................................. F16K 5/06
[52] U.S. Cl. .................. 251/315.13; 251/148; 285/289.1
[58] Field of Search ......................... 251/148, 315.13, 251/315.14; 285/289.1, 289.2, 289.5, 148.13

[56] References Cited

U.S. PATENT DOCUMENTS

| | | |
|---|---|---|
| 654,735 | 7/1900 | Jordan . |
| 1,072,208 | 9/1913 | Dahl . |
| 2,148,746 | 2/1939 | Hampe et al. . |
| 2,148,747 | 2/1939 | Hampe et al. ................... 285/289.2 X |
| 2,722,437 | 11/1955 | Phillips ...................................... 285/72 |
| 3,126,194 | 3/1964 | Franck .................................... 251/148 |
| 3,182,952 | 5/1965 | Montesi ................................... 251/148 |
| 3,357,678 | 12/1967 | Dyki ....................................... 251/148 |
| 3,550,902 | 12/1970 | Pidgeon et al. ........................ 251/151 |
| 3,879,064 | 4/1975 | Lagarelli .......................... 285/289.1 X |
| 4,460,157 | 7/1984 | Marchal .............................. 251/315.13 |
| 4,667,928 | 5/1987 | Davatz et al. .......................... 251/315 |
| 4,852,917 | 8/1989 | Viall, Jr. ................................. 285/353 |
| 5,636,876 | 6/1997 | Eidsmore ................................. 285/39 |

*Primary Examiner*—John Fox
*Attorney, Agent, or Firm*—Fish & Richardson P.C.

[57] ABSTRACT

A ball valve assembly has thin-walled tailpieces of a high thermal conductivity material, e.g., copper. The tailpieces are removably mounted to the body, allowing the valve body and heat sensitive components to be removed from thermal contact during sweating.

5 Claims, 1 Drawing Sheet

BALL VALVE ASSEMBLIES

BACKGROUND OF THE INVENTION

The invention relates to ball valves for installation in piping.

Ball valve assemblies are often placed in fluid flow lines by "sweating" (i.e., soldering) the inlet and outlet of the ball valve assembly to opposed ends of piping. The elevated temperatures associated with sweating can, in some instances, cause thermal damage to plastic seals and other temperature-sensitive valve components within the ball valve assembly.

SUMMARY OF THE INVENTION

The invention provides a ball valve assembly that can be quickly and easily installed by sweating, with lower risk of thermal damage to thermally-sensitive valve components. The ball valve assembly of the invention includes removable tailpieces having thin walls of a relatively high thermal conductivity material, e.g., copper. The removable tailpieces can be disassembled from the valve body subassembly and sweat into place onto opposed pipe ends, with the valve body then reassembled to the tailpieces, typically after the tailpieces have cooled, thereby removing any possibility of thermal damage to the valve components.

In one aspect, the invention features a ball valve assembly that includes (a) a valve body defining an inlet and an outlet, and a passageway for flow of fluid from the inlet to the outlet, (b) a ball valve subassembly comprising a ball valve element disposed within the passageway for rotational movement between a first position allowing flow of fluid from the inlet toward the outlet and a second position resisting flow of fluid from the inlet toward the outlet, and valve components susceptible to thermal damage at a predetermined temperature below sweating temperature, (c) a first attachment member in removable engagement with the valve body at the inlet and a second attachment member in removable engagement with the valve body at the outlet, (d) a first tailpiece releasably secured to the valve body at the inlet by the first attachment member, and (e) a second tailpiece releasably secured to the valve body at the outlet by the second attachment member, the first tailpiece and the second tailpiece adapted for attachment to opposed pipe ends by sweating.

In preferred embodiments, the first attachment member comprises a first union nut removably attached upon the valve body in threaded engagement, and the second attachment member comprises a second union nut removably attached upon the valve body in threaded engagement.

In another aspect, the invention features a method for installing a ball valve assembly between opposed pipe ends. The method includes (a) engaging a first tailpiece upon a first pipe end, (b) joining the first tailpiece to the first pipe end in leak-tight relationship by sweating at a predetermined sweating temperature, (c) engaging a second tailpiece upon a second pipe end generally opposing the first pipe end, (d) joining the second tailpiece to the second pipe end in leak-tight relationship by sweating at a predetermined sweating temperature, (e) thereafter, placing a ball valve subassembly between the first tailpiece and the second tailpiece, the ball valve subassembly including a valve body defining an inlet and an outlet and a passageway for flow of fluid from the inlet to the outlet, a ball valve element disposed within the valve body for rotational movement between a first position allowing flow of fluid from the inlet toward the outlet and a second position resisting flow of fluid from the inlet toward the outlet, and valve components susceptible to thermal damage at a damage temperature below the predetermined sweating temperature, (f) engaging a first attachment member in leak-tight threaded engagement with the valve body at the inlet in a manner to secure the first tailpiece to the valve body, and (g) engaging a second attachment member in threaded engagement with the valve body at the outlet in a manner to secure the second tailpiece to the valve body.

Other features and advantages will be apparent from the following description of a presently preferred embodiment, and from the claims.

BRIEF DESCRIPTION OF THE DRAWINGS

FIG. 3 is a similar view of the tailpieces of the valve assembly of the invention sweated to the opposed ends of piping; and FIG. 4 is a similar view of the valve assembly of the invention reassembled with the tailpieces sweated to the opposed ends of piping.

DESCRIPTION OF THE PREFERRED EMBODIMENTS

Figure 1:
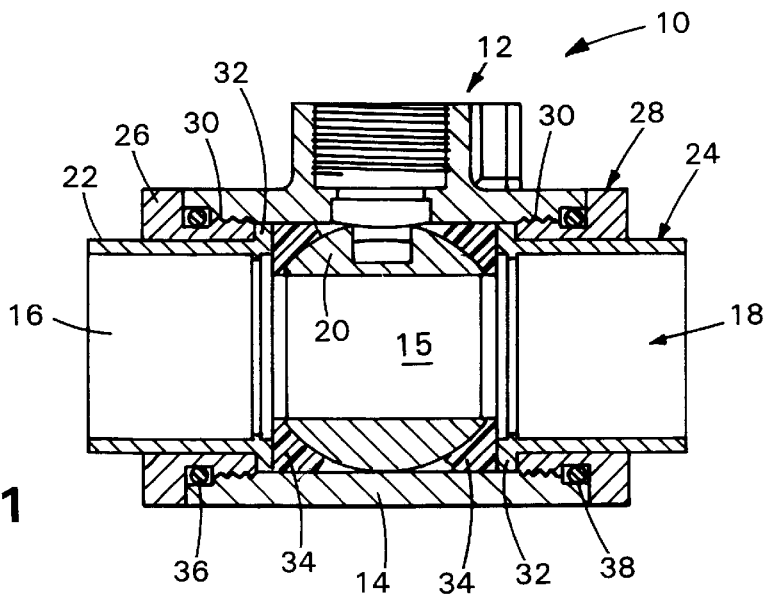
FIG. 1 is a side cross-sectional view of a ball valve assembly according to one aspect of the invention, with the tailpieces removably mounted to the valve body by union nuts.

Referring to FIG. 1, a ball valve assembly 10 includes a central ball valve subassembly 12 of standard construction, including a valve body 14 defining a passageway 15 for flow of fluid between an inlet 16 and an outlet 18. The ball valve subassembly 12 further includes a ball valve element 20, which can be rotated (arrow, R) between an open position (shown) and a closed position using any suitable means (not shown), e.g. a manually-actuated handle or an electric, pneumatic or hydraulic actuator, all as well known in the art.

To permit the ball valve assembly 10 to be easily sweat into place, without damage to heat-sensitive components, such as plastic seals 34, the ball valve assembly further includes a pair of removable tailpieces 22, 24. The tailpieces have thin walls and are formed of a high thermal conductivity, solderable material, e.g., copper, to allow them to be quickly brought to sweating temperature. The valve body 14 is formed of metal, typically cast bronze.

Tailpieces 22, 24 are releasably mounted to the valve body 14 by threaded union nuts 26, 28, in engagement with threads 30 defined at opposite ends of the valve body 14 in the regions of the inlet and outlet. A pair of seals 36, 38, e.g., o-rings, are mounted between the union nuts 26, 28 and the valve body 14 to provide a fluid-tight seal. Union nuts 26, 28 engage the shoulders 32 of the corresponding tailpieces 22, 24, which, in turn, bear upon the valve seals 34, urging the valve seals into sealing engagement upon the opposite surfaces of valve element 20.

Figure 2:
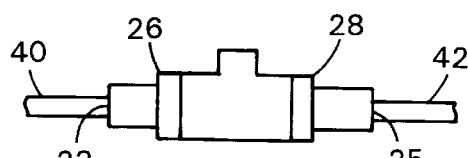
FIGS. 2, 3 and 4 are sequential views, in which Fig, 2 is a side view of the tailpieces of a valve assembly of the invention positioned on the opposed ends of piping.
Figure 4:
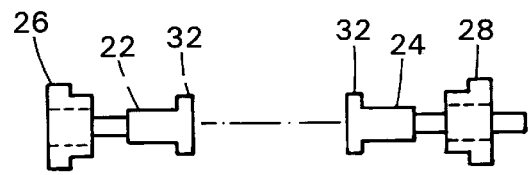
Figure 3:
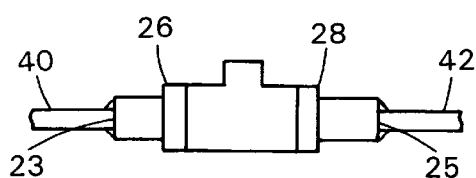

Referring to FIGS. 2–4, a method of the invention for installing a ball valve assembly 10 in a fluid flow line will now be described.

First, the ball valve assembly is partially disassembled by removing the union nuts and tailpieces. Thus, referring first to FIG. 2, union nuts 26, 28 are unthreaded from the body and the tailpieces are removed. The union nuts are then slid onto the respective opposed ends 40, 42 of the piping to positions removed from the ends. The pipe ends 40, 42 are cleaned and engaged within the bores 23, 25 of the respective tailpieces 22, 24, with a soldering flux material in the spaces between the opposed surfaces of the corresponding pipes and bores.

Referring next to FIG. 3, the region of the joint is then locally heated to raise the temperature to the level required for sweating, and solder is applied to be drawn as a liquid into the space between the opposed surfaces of the corresponding pipe and bore. The solder then cools and hardens, securing the pipe ends within the tailpieces, and providing a leak-free seal.

Referring finally to FIG. 4, the ball valve assembly is then reassembled by threading the union nuts 26, 28 onto the valve body 14, with the shoulder 32 of each tailpiece engaged by the respective union nut. Tightening of the union nuts 26, 28 urges the shoulders 32 of the corresponding tailpieces 22, 24 inwardly, which, in turn, bears upon the valve seals 34, to urge the valve seals into sealing engagement upon the surface of valve element 20.

The installation method shown in FIGS. 2–4 and described above requires that there be axial play in the piping, to allow axial movement of the tailpiece faces, first outwardly to allow the valve body to be placed in position, and then inwardly, into the valve passageway, to bear upon the valve seal.

Figure 5:
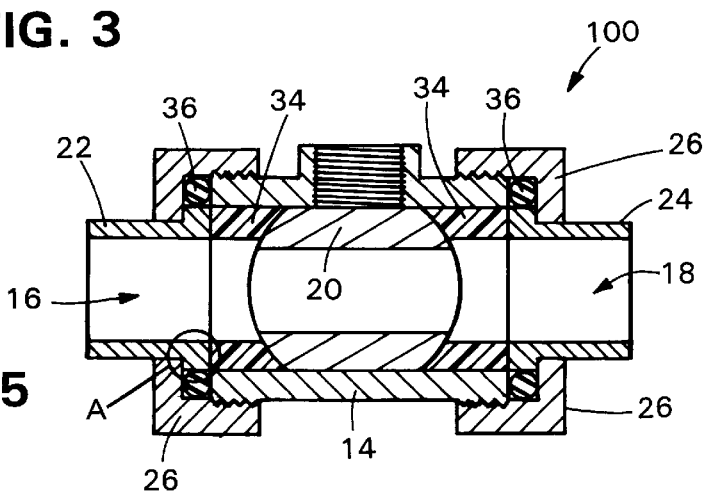
FIG. 5 is a side cross-sectional view of a ball valve assembly according to an alternate aspect of the invention.

Another embodiment of the ball valve assembly of the invention is especially suited for use, e.g., in environments where there is no axial play in the piping. Referring to FIG. 5, ball valve assembly 100 is similar to ball valve assembly 10, discussed above, and the components have been numbered accordingly. However, ball valve assembly 100 differs in that the union nuts and valve body are constructed to that the union nuts thread onto the outside, rather than the inside, of the valve body. Also, the valve body is sized to fit between the sweated-in-place tailpieces without axial movement of the opposed pipes. Threading the union nut 26 onto the valve body 14 presses tailpieces 22, 24 upon the plastic seals 34, resulting in shoulder-to-shoulder contact at region A. This contact results in sealing contact between the plastic seals 34 and the ball element 20.

Other embodiments are within the following claims.

What is claimed is:

1. A ball valve assembly comprising:

a valve body defining an inlet and an outlet, and a passageway for flow of fluid from said inlet to said outlet, a ball valve subassembly comprising a ball valve element disposed within said passageway for rotational movement between a first position allowing flow of fluid from said inlet toward said outlet and a second position resisting flow of fluid from said inlet toward said outlet, and valve components susceptible to thermal damage at a predetermined temperature below sweating temperature, a first attachment member in removable engagement with said valve body at said inlet and a second attachment member in removable engagement with said valve body at said outlet, a first tailpiece releasably secured to said valve body at said inlet by said first attachment member, and a second tailpiece releasably secured to said valve body at said outlet by said second attachment member, said first tailpiece and said second tailpiece adapted for attachment to opposed pipe ends by sweating.

2. The ball valve assembly of claim 1 wherein said first attachment member comprises a first union nut removably attached upon said valve body in threaded engagement.

3. The ball valve assembly of claim 1 wherein said second attachment member comprises a second union nut removably attached upon said valve body in threaded engagement.

4. The ball valve assembly of claim 2 wherein said second attachment member comprises a second union nut removably attached upon said valve body in threaded engagement.

5. A method for installing a ball valve assembly between opposed pipe ends, said method comprising the steps of:

engaging a first tailpiece upon a first pipe end, joining the first tailpiece to the first pipe end in leak-tight relationship by sweating at a predetermined sweating temperature, engaging a second tailpiece upon a second pipe end generally opposing said first pipe end, joining the second tailpiece to the second pipe end in leak-tight relationship by sweating at a predetermined sweating temperature, thereafter, placing a ball valve subassembly between said first tailpiece and said second tailpiece, said ball valve subassembly including a valve body defining an inlet and an outlet and a passageway for flow of fluid from the inlet to the outlet, a ball valve element disposed within the valve body for rotational movement between a first position allowing flow of fluid from the inlet toward the outlet and a second position resisting flow of fluid from the inlet toward the outlet, and valve components susceptible to thermal damage at a damage temperature below said predetermined sweating temperature, engaging a first attachment member in leak-tight threaded engagement with the valve body at the inlet in a manner to secure said first tailpiece to said valve body, and engaging a second attachment member in threaded engagement with said valve body at said outlet in a manner to secure said second tailpiece to said valve body.

* * * * *